May 26, 1964

M. O. HOLOWATY ETAL 3,134,667

PELLETIZING OF IRON ORE FOR SINTERING

Filed Feb. 5, 1960

Inventors:
Michael O. Holowaty,
Arthur M. Schwarz,
By Merriam, Smith & Marshall,
Attys.

3,134,667
PELLETIZING OF IRON ORE FOR SINTERING
Michael O. Holowaty, Gary, Ind., and Arthur M. Schwarz, Calumet City, Ill., assignors to Inland Steel Company, Chicago, Ill., a corporation of Delaware
Filed Feb. 5, 1960, Ser. No. 7,098
6 Claims. (Cl. 75—3)

This invention relates to a novel method in the art of preparing iron ore concentrates for agglomeration so that they can be used commercially in a sintering process. The present invention provides a composite pellet wherein the primary pellet constituting a mixture of iron ore, iron ore concentrates, and carbonaceous fuel, is contained within a tenacious shell of finely divided iron ore particles which have been sprinkled onto the primary pellet to form a coating thereon.

In the past it has been common practice to produce pellets from concentrates which were made to adhere to each other through the use of bonding materials such as bentonite, magnesium chloride, calcium chloride, or the like. These concentrates, although pelletized, were not used successfully in the sintering process because the heat of sintering caused the pellets to disintegrate and thereby clog the sinter bed and reduce the permeability of the bed to such a condition as to make sintering impossible. As a consequence of this condition, the processes used in the prior art were limited to producing a heat-hardened pellet in which there was partial fusion of the iron ore concentrates within the individual pellets and no fusion at all as between adjoining pellets to form a sintered product.

The present invention produces a sintered product in which the individual pellets lose their identity as pellets when fused together to form the sintered product. This sintered product is then used as a part of the charge in a blast furnace in the making of iron (for steel).

The sinter production rate effected through the use of the pellets of the present invention is found to be greatly increased from that which was obtained through the use of methods heretofore known. This is due in part to the ability of the pellets of the present invention to become fused rather than disintegrating under the heat of sintering, as was common with the use of pellets of the prior art when they were exposed to the heat of the sintering process. The fusing of the pellets of the present invention without disintegration permits the sintering bed to retain the permeability necessary to sustain the sintering process.

Figure 1:
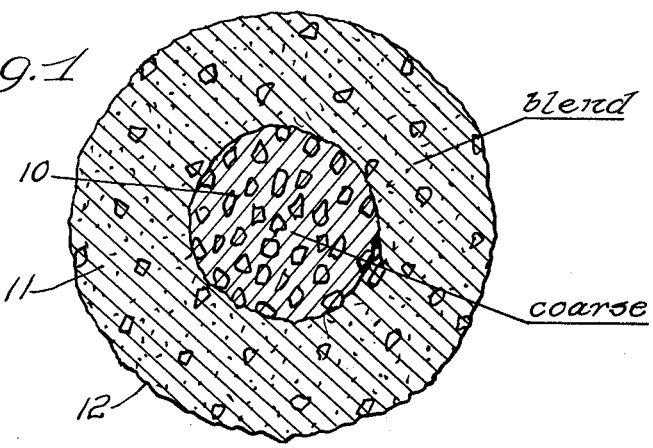
Figure 2:
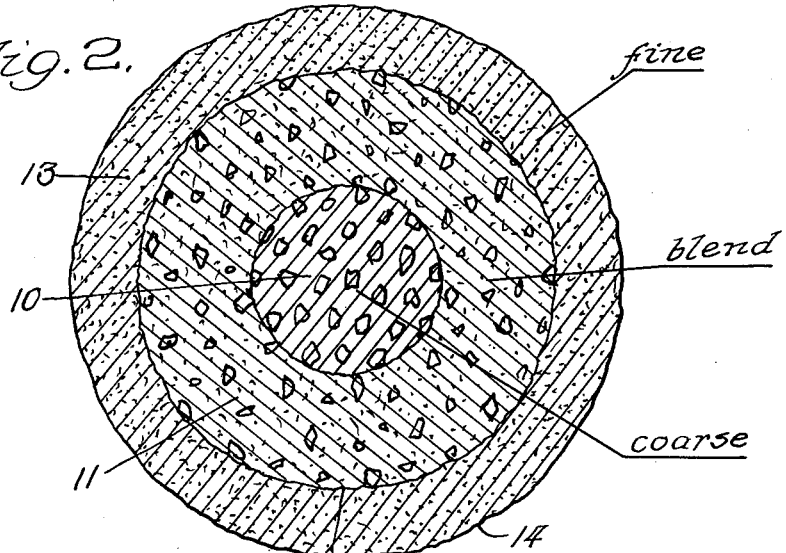
Figure 3:
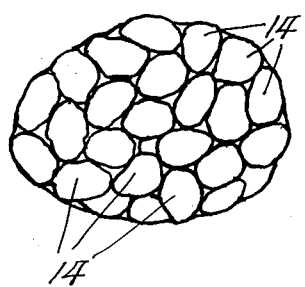

In the accompanying drawing:
FIGURE 1 shows a cross-section of the primary pellet wherein the core is of a coarse ore surrounded by a layer of concentrate ore blend with the carbonaceous fuel interspersed throughout both layers;
FIGURE 2 shows a cross-section of the final pellet wherein a tenacious outer shell of finely divided iron ore particles has been formed surrounding the primary pellet;
FIGURE 3 shows the pellets grouped together before being sintered; and
FIGURE 4 shows the sintered product in which the individual pellets have lost their identity as pellets to form the product which is ready for use as feed in the blast furnace.

Now making reference to the drawings and first to FIGURE 1—a nucleus or core of coarse iron ore 10 is shown surrounded by a layer 11 comprising a blend of iron ore and iron ore concentrates which together with the carbonaceous fuel interspersed throughout the primary pellet go to form the primary pellet 12. The primary pellet 12 is formed by charging the mixture of iron ore and iron ore concentrates along with the carbonaceous fuel into a pelletizing drum which then rotates and tumbles the mixture to form the pellet.

After primary pellets have been formed, they are once again charged into a pelletizing drum where fine particles of iron ore 13 are sprinkled onto the primary pellets while the pelletizing drum is rotating, to produce the composite pellet 14 as shown in FIGURE 2. The fine particles of iron ore 13 produce a tenacious outer shell which protects the primary pellet from disintegration during the sintering process.

Figure 4:
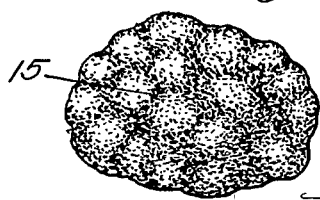

The composite pellets 14 as shown in FIGURE 3 are used as a feed material for sintering in a sintering machine according to known techniques which will produce the sinter product 15 which is shown in FIGURE 4.

The sinter product 15 is then capable of being fed into a blast furnace as part of the charge in the iron-making process.

The present invention provides a pellet comprising a "clayey" iron ore and iron ore concentrates which have been pelletized in a pelletizing drum along with a carbonaceous fuel to form a primary pellet, which is then surrounded or encased within a hard surface coating comprised of a finely divided adhesive iron ore which is then sprinkled onto the primary pellet while rotating in the drum. This surface coating changes the sintering characteristics of the original mixture by preventing a disintegration of the primary pellet through "peeling" off or breaking away of the iron ore concentrates. The moisture content of the primary pellet should be sufficient to cause an adherence of the outer shell to the primary pellet. It has been known that concentrates of certain iron ores such as specular hematitic concentrates of fine mesh sizes have been rather difficult to agglomerate because of their tendency to "peel" or disintegrate when being sintered. Such concentrates could not be agglomerated and used successfully in the sintering process and therefore many processes were developed to agglomerate them in the form of individual heat-hardened pellets; but none of the processes to produce sinter from the raw concentrate pellets have met with commercial success.

The present invention improves the sintering characteristics of iron ore concentrates such as specular hematitic concentrates of fine mesh sizes, by employing the novel technique of mixing the iron ore concentrates with a "clayey" ore and then pelletizing this mixture, along with a carbonaceous fuel to form a primary pellet. The pellets so formed are then coated with a finely divided coating of an adhesive iron ore which produces a tenacious shell around the pellet and prevents disintegration of the inner primary pellet while the feed is being sintered.

The pellets formed according to the present invention are comprised of three distinct layers: an inside layer containing a coarse ore; a surrounding blended layer of iron ore concentrates and iron ore; and a surface coating of finely divided iron ore particles which form a tenacious outer shell.

According to the present invention, the concentrates either in a dry or natural form are intimately mixed with a fraction of a "clayey" ore which is employed in the agglomeration process. It is important that the "clayey" ore be characterized by binding properties greater than the binding properties present in the concentrate alone. Such "clayey" ores commonly known as red hematites are present in abundant quantities in the Mesabi range and in portions of the Marquette and Gogebic ranges as well as in other ranges. A fraction of the total ore used is blended with the concentrates in a conventional manner. Carbonaceous fuel is added in sufficient quantities to effect the sintering of the pellets; and this mixture is charged into pelletizing drums. The other fraction of the ore to be used is pre-dried and screened to provide fine particles which are sprinkled into a rotating pelletizing drum after the primary pellets are fully formed to produce the tenacious outer shell of the composite pellet. The pellets thus formed contain a tenacious shell comprised primarily of the finely divided particles of the red hematite ore. These pellets are then fed into a sintering apparatus where they are sintered according to known sintering techniques.

A specific example of the process employed in the present invention is as follows:

EXAMPLE I

*Iron Ore Concentrate Used*

| Material: | Percent |
|---|---|
| $Fe_2O_3$ | 91.99 |
| $SiO_2$ | 7.34 |
| $Al_2O_3$ | .67 |

*Iron Ore Used*

| Material: | Percent |
|---|---|
| $Fe_2O_3$ | 81.20 |
| $SiO_2$ | 9.41 |
| $Al_2O_3$ | 2.65 |
| $CaO$ | 1.00 |
| $MgO$ | 2.37 |
| Water of hydration and misc. impurities | 3.37 |

Carbonaceous fuel is added in sufficient quantities to effect the sintering of the pellets according to known sintering techniques.

In this example, the novel technique of the present invention was employed in that one-half of the iron ore by weight was mixed with iron ore concentrates and with carbonaceous fuel in sufficient quantities for sintering purposes in a conventional manner and then this mixture was charged into pelletizing drums to form the primary pellets. After the primary pellets were formed, the other half of the iron ore which had been pre-dried and screened to minus twenty mesh size, was sprinkled into the rotating drum and there coated onto the primary pellets. The outer shell of the pellets so formed is comprised primarily of red hematite ore. The size of the composite pellets varied from ⅛ to ½ inch in diameter.

The composite pellets formed were comprised of three distinct layers: an inside layer of coarse ore; a surrounding blended layer of iron ore concentrates and iron ore with carbonaceous fuel mixed throughout the two layers of the primary pellet; and a tenacious surface coating of finely divided particles. Sintering of these pellets was characterized by a permeability of the sintering bed which remained satisfactory at all times during the process and which was capable of sustaining sintering so that the pellets would fuse.

It appears that the fraction of specular concentrates in the commercial blend could be approximately 70% of the metallic burden and the "clayey" iron ore could be at least 30% of the metallic burden of the pellets, and the pellets can be successfully sintered under the present invention.

The agglomerating properties of most concentrates are known to be increased by the addition of a wetting agent and the use of fluxes and binders when necessary. Some fluxes which may be used as limestone, dolomite, and the like. However, in the present invention, when the moisture content of the concentrates is between 9% and 9.5%, no further wetting is necessary. The present invention further distinguishes from the prior art in that no binders were used in preparing the pellet feed for sintering.

While the above description constitutes a preferred embodiment of this invention, it is obvious that the invention may be otherwise embodied or practiced so that all modifications which are within the scope of the following claims are understood to have been intended.

What is claimed is:

1. A pellet of iron ore for a sintering process, said pellet consisting essentially of coarse red hematite iron ore, iron concentrates normally disintegrable upon sintering in pelletized form, carbonaceous fuel, and fine red hematite iron ore, in the form of:

an innermost layer containing said coarse red hematite iron ore and said carbonaceous fuel;

a middle layer containing a blend of coarse red hematite iron ore, said iron ore concentrates, and carbonaceous fuel;

and an outer layer consisting essentially of said fine red hematite iron ore.

2. A pellet as recited in claim 1 wherein said iron ore concentrates are specular hematite.

3. A pellet of iron ore for a sintering process, said pellet consisting essentially of coarse red hematite iron ore, iron ore concentrates normally disintegrable upon sintering in pelletized form, carbonaceous fuel, and fine red hematite iron ore, in the form of:

an innermost layer containing said coarse red hematite iron ore and said carbonaceous fuel;

a middle layer containing said iron ore concentrates and carbonaceous fuel;

and an outer layer consisting essentially of said fine red hematite iron ore.

4. A pellet as recited in claim 3 wherein said iron ore concentrates are specular hematite.

5. A pellet as recited in claim 3 wherein said red hematite ore constitutes at least 30% of the metallic burden of said pellet.

6. A method for forming iron ore pellets for sintering, said method comprising:

preparing a primary pellet consisting essentially of coarse red hematite iron ore, carbonaceous fuel, and iron ore concentrate normally disintegrable upon sintering in pelletized form, in the form of an inner layer containing said coarse red hematite iron ore and carbonaceous fuel, and a concentric surrounding layer containing a blend of said coarse red hematite iron ore, said iron ore concentrate and carbonaceous fuel;

and coating said primary pellet, after formation thereof, with finely divided particles of red hematite iron ore to form a tenacious shell around said primary pellet which protects the primary pellet from disintegration during sintering.

References Cited in the file of this patent

UNITED STATES PATENTS

| 2,127,632 | Najarian | Aug. 23, 1938 |
| 2,543,898 | De Vaney | Mar. 6, 1951 |
| 2,582,386 | Komarek et al. | Jan. 15, 1952 |
| 2,960,396 | De Vaney | Nov. 15, 1960 |

UNITED STATES PATENT OFFICE
CERTIFICATE OF CORRECTION

Patent No. 3,134,667            May 26, 1964

Michael O. Holowaty et al.

It is hereby certified that error appears in the above numbered patent requiring correction and that the said Letters Patent should read as corrected below.

Column 4, line 13, after "iron" insert -- ore --.

Signed and sealed this 15th day of September 1964.

(SEAL)
Attest:

ERNEST W. SWIDER
Attesting Officer

EDWARD J. BRENNER
Commissioner of Patents